US009175769B1

United States Patent
Itoo et al.

(10) Patent No.: US 9,175,769 B1
(45) Date of Patent: Nov. 3, 2015

(54) SPEED CHANGE APPARATUS OF VEHICLE

(71) Applicant: KAWASAKI JUKOGYO KABUSHIKI KAISHA, Hyogo (JP)

(72) Inventors: Seiji Itoo, Akashi (JP); Ayumi Hamada, Akashi (JP); Taisuke Morita, Amagasaki (JP); Jun Takagi, Kakogawa (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 14/261,669

(22) Filed: Apr. 25, 2014

(51) Int. Cl.
*F16H 63/38* (2006.01)
*B60K 20/08* (2006.01)
*F16H 61/36* (2006.01)
*F16H 63/30* (2006.01)

(52) U.S. Cl.
CPC ............... *F16H 63/38* (2013.01); *B60K 20/08* (2013.01); *F16H 61/36* (2013.01); *F16H 2063/3076* (2013.01)

(58) Field of Classification Search
CPC ... F16H 63/38; F16H 61/36; F16H 2059/026; F16H 2059/047; F16H 59/02; F16H 2063/3076; F16H 2063/3089; B60K 20/08
USPC .............. 74/473.15, 473.24–473.26; 180/336
See application file for complete search history.

(56) References Cited

U.S. PATENT DOCUMENTS

| | | | | |
|---|---|---|---|---|
| 2,369,690 A * | 2/1945 | Roth | ................................ | 74/565 |
| 2,775,134 A * | 12/1956 | Swenson | ..................... | 74/473.33 |
| 2,926,762 A * | 3/1960 | Edgley | ........................ | 192/219.5 |
| 3,863,520 A * | 2/1975 | Moline et al. | ............... | 74/473.23 |
| 4,005,614 A * | 2/1977 | Moore et al. | .................. | 74/502.2 |
| 4,721,004 A * | 1/1988 | Ward | .......................... | 74/473.21 |
| 4,907,465 A * | 3/1990 | Machida et al. | ............... | 74/89.2 |
| 5,277,077 A * | 1/1994 | Osborn | ....................... | 74/473.21 |
| 5,309,783 A * | 5/1994 | Doolittle et al. | ........... | 74/473.21 |
| 5,372,050 A * | 12/1994 | Shinki et al. | ................. | 74/473.31 |
| 5,388,476 A * | 2/1995 | Harger et al. | ................. | 74/473.1 |
| 5,582,073 A * | 12/1996 | Takeuchi et al. | ............ | 74/473.23 |
| 5,785,626 A * | 7/1998 | Osborn et al. | ................... | 477/99 |
| 6,000,296 A * | 12/1999 | Sundquist | .................. | 74/473.12 |
| 6,098,483 A * | 8/2000 | Syamoto et al. | ............ | 74/473.18 |
| 6,186,263 B1 * | 2/2001 | Takano | .......................... | 180/336 |
| 6,282,974 B1 * | 9/2001 | Kataumi et al. | ............ | 74/473.28 |
| 6,446,521 B1 * | 9/2002 | Hama et al. | ...................... | 74/335 |
| 6,817,263 B2 * | 11/2004 | Miguchi | ....................... | 74/473.3 |
| 6,857,499 B2 * | 2/2005 | Kawamoto et al. | ............ | 180/336 |
| 6,904,996 B2 * | 6/2005 | Mita et al. | ...................... | 180/336 |
| 7,533,755 B2 * | 5/2009 | Miyazaki et al. | ............. | 180/336 |
| 7,648,001 B2 * | 1/2010 | Yanagihara et al. | .......... | 180/336 |
| 9,057,436 B1 * | 6/2015 | Itoo et al. | ............................... | 1/1 |
| 2003/0041684 A1 * | 3/2003 | Jones, Jr. | ..................... | 74/473.15 |
| 2004/0000209 A1 * | 1/2004 | Nagasawa | ..................... | 74/473.3 |
| 2006/0060018 A1 | 3/2006 | Miyazaki et al. | | |
| 2006/0236804 A1 * | 10/2006 | Ruhlander | .................... | 74/502.2 |

FOREIGN PATENT DOCUMENTS

JP 2006-82737 3/2006

* cited by examiner

*Primary Examiner* — Laura Freedman
(74) *Attorney, Agent, or Firm* — Wenderoth, Lind & Ponack, L.L.P.

(57) ABSTRACT

A speed change apparatus for a vehicle includes a gear transmission, a shift lever device arranged in a zone where a driver on a driver's seat can operate the shift lever device, and an operation force transmission mechanism. The shift lever device is provided with a detent mechanism for positioning and holding the shift lever at each shift position, and an operation force transmission mechanism is constituted by a push pull cable.

5 Claims, 10 Drawing Sheets

SPEED CHANGE APPARATUS OF VEHICLE

BACKGROUND OF INVENTION

1. Field of the Invention

The present invention relates to a speed change apparatus of a vehicle including a gear transmission, a shift lever device arranged in a zone where a driver on a driver's seat can operate the shift lever device, and an operation force transmission mechanism for transmitting an operation force of the shift lever device to the gear transmission.

2. Description of the Prior Art

FIG. 12 shows a shift lever device according to a conventional art described in JP Laid-open Publication No. 2006-082737. A shift' lever 301 is turnable in a forward and rearward direction and in a right and left direction by two lever shafts 310, 311. The two lever shafts 310,311 are at right angles to one another. The shift lever 301 is connected to a shift device in a gear transmission (not shown) through a push pull cable 302. The shift device in the transmission is provided with a detent mechanism for holding a shift shaft at a shift position. FIG. 13 shows a plan view of the shift panel 303 of FIG. 12, a shift groove 305 is formed in a shape having a plurality of bended portions. The shift groove 305 is provided with a plurality of engaging recesses 305a for engaging with the shift lever 301. The engaging recesses 305a are formed at a reverse position (R), a neutral position (N), a forward traveling high-speed position (H), and a forward traveling low-speed position (L).

In the case that the shift lever 301 is positioned and held at each of the shift positions only by the shape of the shift groove 305, it is required that the shift lever 301 is turnable in the two directions. Therefore, shift lever device becomes large and complex. In particular, in the case that a push pull cable is provided as an operation force transmission mechanism, even if a detent mechanism is provided in the shift device, a difference will easily occur between the a turning position of the shift lever and a moving position of the shift shaft in the transmission. Therefore, it is required to make the shape of the shift groove complex as mentioned above. Moreover, it takes time and effort to adjust the turn position of the shift lever 301.

SUMMARY OF THE INVENTION

The present invention has been devised in view of the above-mentioned problems. An object thereof is to provide a speed change apparatus of a vehicle in which an adjustment for a turn position of the shift lever becomes easy, an arrangement flexibility of the shift lever increases, or the shift lever becomes compact.

In order to achieve the above-mentioned object, the first subject matter of the present invention provides a speed change apparatus of a vehicle comprising: a gear transmission; a shift lever device arranged in a zone where a driver on a driver's seat can operate the shift lever device; and an operation force transmission mechanism for transmitting an operation force of the shift lever device to the gear transmission, wherein the shift lever device is provided with a detent mechanism for positioning and holding the shift lever at each shift position, and an operation force transmission mechanism is constituted by a push pull cable.

According to the first subject matter of the present invention, since the operation force transmission mechanism is constituted by the push pull cable, a layout flexibility for the push pull cable between the shift lever device and the transmission and the shift lever device increase. Therefore, a design of the vehicle becomes facilitated. In addition, since the detent mechanism is provided in the shift lever device which is located near the driver's hand, it becomes easy to adjust the shift lever device.

In addition to the above-mentioned the first subject matter, the first subject matter may preferably employ the following configurations.

(a) The shift lever device is arranged on a dashboard located in front of the driver's seat.

According to the above-mentioned configuration (a), it becomes possible to make efficient use of a space in front of the driver, and the driver can check the shift position of the shift lever even when the driver looks forward.

(b) The transmission is arranged in a rear portion of the vehicle.

According to the above-mentioned configuration (b), it becomes possible to separately place the transmission from the shift lever device while exerting above the effects of the present invention.

(c) The shift lever device includes a shift panel. The shift panel is provided with a shift groove of an approximately straight line shape through which the shift lever passes.

According to the above-mentioned configuration (c), since the shift lever can turn around an axis of only one shaft, the shift lever device becomes compact and simple.

In order to achieve the above-mentioned object, the second subject matter of the present invention provides a speed change apparatus of a vehicle comprising: a gear transmission; a shift lever device arranged in a zone where a driver on a driver's seat can operate the shift lever device; and an operation force transmission mechanism for transmitting an operation force of the shift lever device to the gear transmission, wherein the shift lever device is provided with a detent mechanism for positioning and holding the shift lever at each shift position, the detent mechanism includes a recess-formed member having a plurality of recesses, and a detent member biased toward the recess-formed member by an elastic member, each of the recesses corresponds to each of the shift positions, the recess-formed member is arranged on the shift lever which is turnable around a center of the shift lever shaft, and the detent member and the elastic member are arranged on a lever holder for holding the shift lever.

According to the second subject matter, since the recess-formed member having the detent recess is arranged on the shift lever which is turnable, the shift lever becomes compact while securing the stroke of the shift lever, i.e. the stroke of the cable connecting point.

In addition to the above-mentioned the second subject matter, the second subject matter may preferably employ the following configurations.

(d) The shift lever device includes a shift panel. The shift panel is provided with a shift groove of approximately straight line shape through which the shift lever passes.

According to the above-mentioned configuration (d), since the operation of the shift lever becomes linear, the operation of the shift lever becomes simple.

(e) The plurality of the recesses is formed on an outer peripheral end of the recess-formed member in the radial direction of the shift lever shaft, and the detent member is biased toward inside from outside of the shift lever shaft in the radial direction.

According to the above-mentioned configuration (e), although the suppress force of the detent member due to the elastic member applies the shift lever, the suppress force does not act the shift lever to bend the shift lever as a bending load. Therefore, on operating the shift lever, the shift lever is not rickety.

(f) The detent member is composed of a cylindrical roller pin parallel to the shift lever shaft.

(g) The operation force transmission mechanism is constituted by a push pull cable.

According to the above-mentioned configuration (g), since the operation force transmission mechanism is constituted by the push pull cable, a layout flexibility for the push pull cable between the shift lever device and the transmission increases, and an arrangement flexibility for the transmission and the shift lever device increase. Therefore, a design of the vehicle becomes facilitated. In addition, since the detent mechanism is provided in the shift lever device which is located near the driver's hand, it becomes easy to adjust the shift lever device.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

FIGS. 1 to 11 show a speed change apparatus according to the present invention and a utility vehicle including the speed change apparatus. Then, an embodiment of the present invention is described below with reference to these drawings. For convenience of description, a forward traveling direction of the utility vehicle will be described as a "front side or forward" of the utility vehicle and respective components, and a right and left direction viewed from a driver will be described as a "right and left direction" of the utility vehicle and the respective components.

Figure 1:
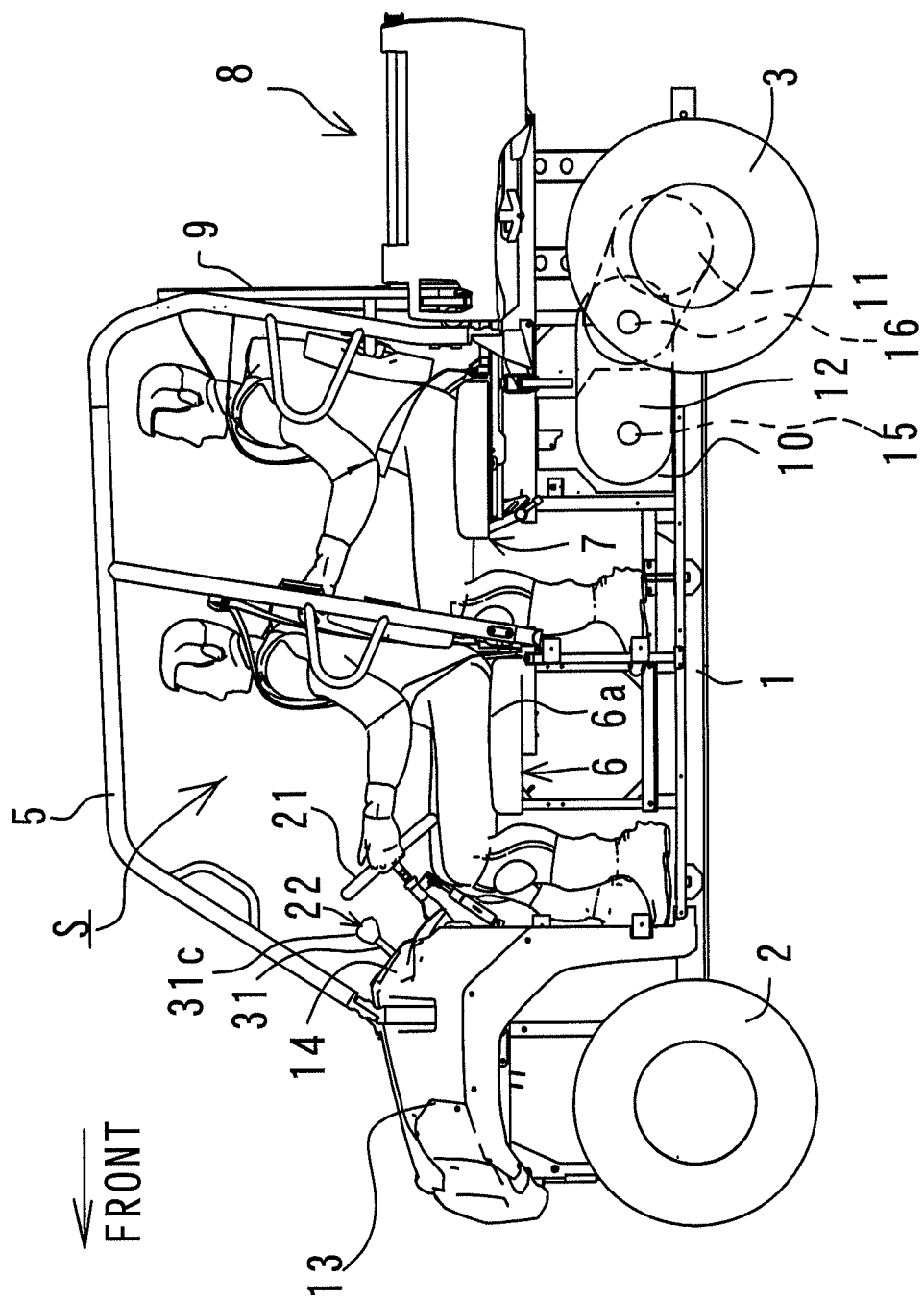
FIG. 1 is a left side view of a utility vehicle including a speed change apparatus according to the present invention.

In FIG. 1, a pair of right and left front wheels 2 is provided in a front portion of a vehicle body frame 1 of the utility vehicle, and a pair of right and left rear wheels 3 is provided in a rear portion of the vehicle body frame 1. A riding space S formed between the front wheels 2 and the rear wheels 3 is surrounded by a ROPS 5, where the ROPS 5 is an abbreviation of a rollover protective structure. A bench type front seat 6 is arranged in a front half portion of the riding space S and a bench type rear seat 7 is arranged in a rear half portion of the riding space S. A cargo bed 8 is provided on a rearward side of the rear seat 7. A screen 9 is arranged between the bench type rear seat 7 and the cargo bed 8. A bonnet 13 is provided in front of the riding space S and a dashboard 14 is provided in an upper rearward end portion of the bonnet 13. A steering wheel device 21 and a shift lever device 22 are provided in the dashboard 14. The steering wheel device 21 and the shift lever device 22 are located in a zone where a driver on a driver's region 6a of the bench type front seat 6 can operate the shift lever device 22 and the steering wheel device 21.

An engine 10 is arranged under the rear seat 7, and a gear transmission 11 is arranged behind the engine 10. An input shaft 16 of the gear transmission 11 is connected to a crankshaft 15 of the engine 10 through a V-belt type continuously variable transmission 12. The V-belt type continuously variable transmission 12 is attached such as to extend from a left side surface of the engine 10 to a left side surface of a front portion of the gear transmission 11.

Figure 2:
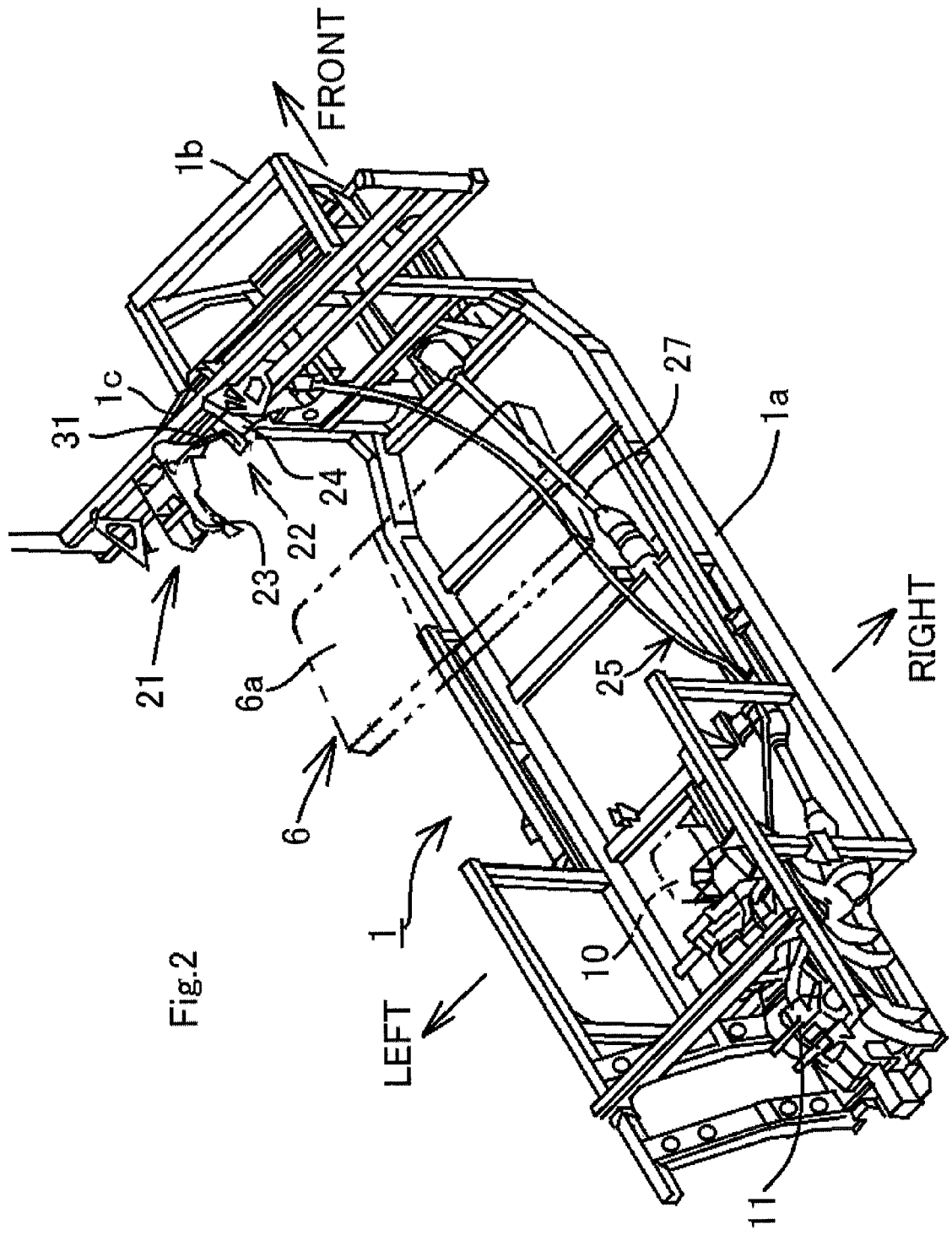
FIG. 2 is a perspective view showing a vehicle body frame and the speed change apparatus shown in FIG. 1.

In FIG. 2, the vehicle body frame 1 includes a mainframe 1a having a rectangular shape elongated in a forward and rearward direction in a plan view, a bonnet frame 1b formed in a front end portion of the mainframe 1a, and a dashboard frame 1c formed in an upper rearward end portion of the bonnet frame 1b. A bracket 23 of the steering wheel device 21 and a lever holder (a bracket) 24 of the shift lever device 22 are fixed to the dashboard frame 1c. In the present embodiment, the driver's region 6a is located in a left end portion of the bench type front seat 6. Thus, the steering wheel device 21 and the shift lever device 22 are arranged at a forward position relative to the driver's region 6a, that is, in a left side portion of the utility vehicle. The gear transmission 11 arranged in a rear end portion of the mainframe 1a and the shift lever device 22 attached to the dashboard frame 1c are connected to each other through a push-pull cable 25 so as to transmit a shift operation force. The push-pull cable 25 serves as an example of an operation force transmission mechanism described in the claims of the present application. The push-pull cable 25 extends downward from the shift lever device 22, reaches the front end portion of the mainframe 1a, then extends right rearward on the mainframe 1a approximately along a propeller shaft 27 for front wheels, and then reaches an upper portion of the gear transmission 11.

Figure 3:
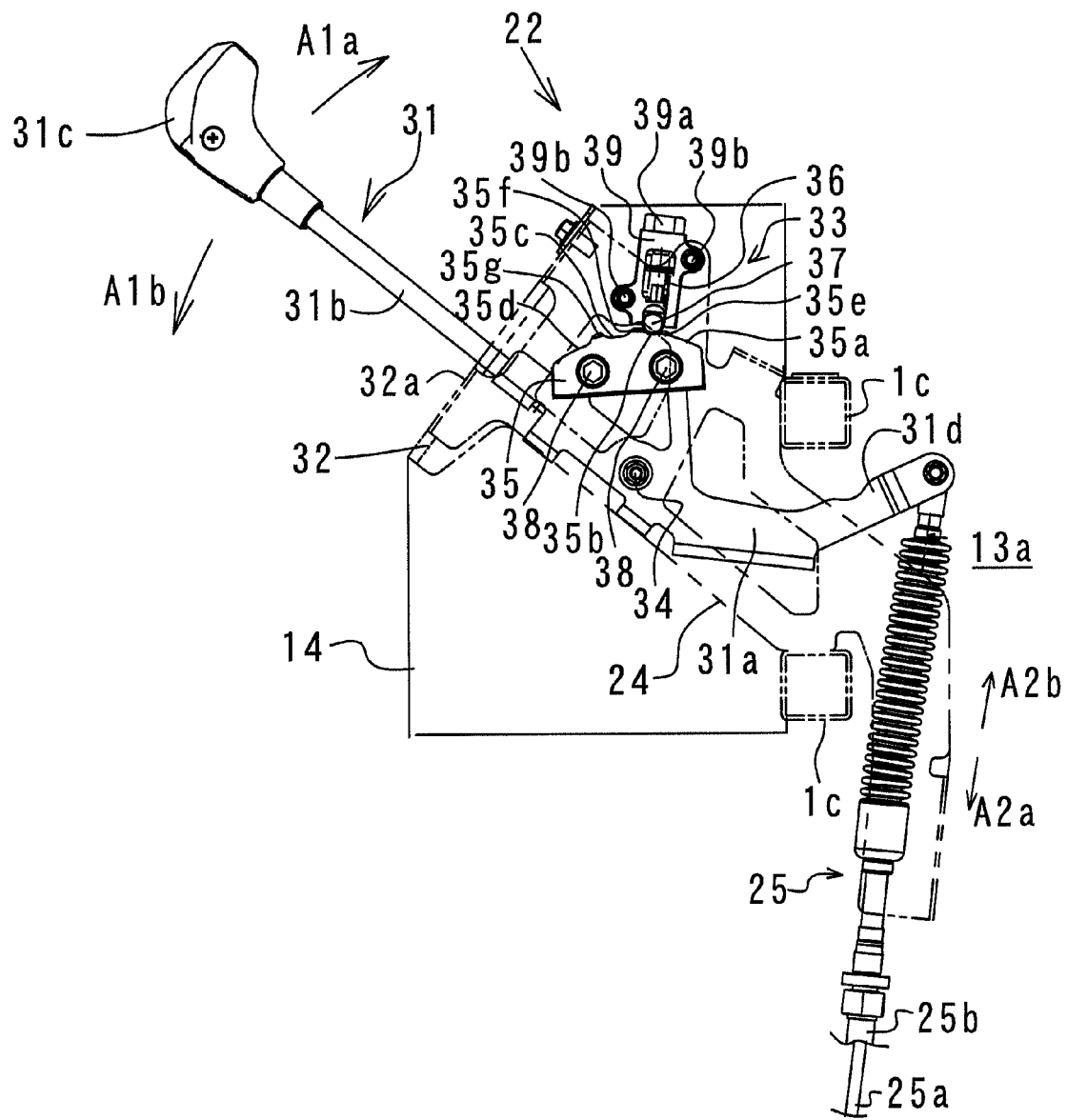
FIG. 3 is a longitudinal sectional view of a shift lever device of the utility vehicle shown in FIG. 1.

In FIG. 3, the shift lever device 22 includes a shift lever 31, a shift panel 32 having a shift groove 32a, and a first detent mechanism 33. The shift lever 31 is provided with a base 31a in sheet metal, a rod 31b, and a knob 31c. The base 31a is supported by the lever holder (a bracket) 24 through a shift lever shaft 34 so as to be turnable or rotatable around a center line of the shift lever shaft 34. The rod 31b is extended from a rear upper end portion of the base 31a, passes throughout the shift groove 32a, and then projects rearward and upward. The base 31a integrally has a connecting arm 31d projecting forward. The connecting arm 31d enters a bonnet room 13a. A front end portion of the connecting arm 31d is connected to an inner cable 25a of the push pull cable 25 at an upper end thereof. The inner cable 25a is inserted in an outer cable 25b. The inner cable 25a and the outer cable 25b are extended downward together.

The first detent mechanism 33 includes a recess formed member 35 provided on the shift lever 31, a spring case 39 provided on the lever holder 24, a first detent spring 36 in the spring case 39, and a first detent pin 37 in the spring case 39. The first detent spring 36 is an example of the elastic member described in the claims, and the first detent pin 37 is an example of the detent member described in the claims.

The spring case 39 is arranged in the vicinity of an upper portion in an inner space of the dashboard 14, and is extended along an upper and down direction. The spring case 39 is fixed to an upper end portion of the lever holder 24 by means of two bolts 39b. The spring case 39 has a lower end opening portion facing recess-formed member 35 from above. An adjust bolt 39a is screwed in an upper end portion of the spring case 39. The first detent spring 36 is located in the spring case 39 so as to be compressible and expandable in the upper and down direction (a vertical direction). The first detent pin 37 is made of a cylindrical member, and is laterally arranged in parallel with the shift lever shaft 34. The first detent pin 37 is housed within the lower end opening portion of the spring case 39, and is movable in in the upper and down direction. The detent pin 37 contacts with a lower end of the first detent spring 36. The first detent pin 37 is pressed from above against an upper end surface of the recess-formed member 35 by an elastic force of the first detent spring 36.

Figure 6:
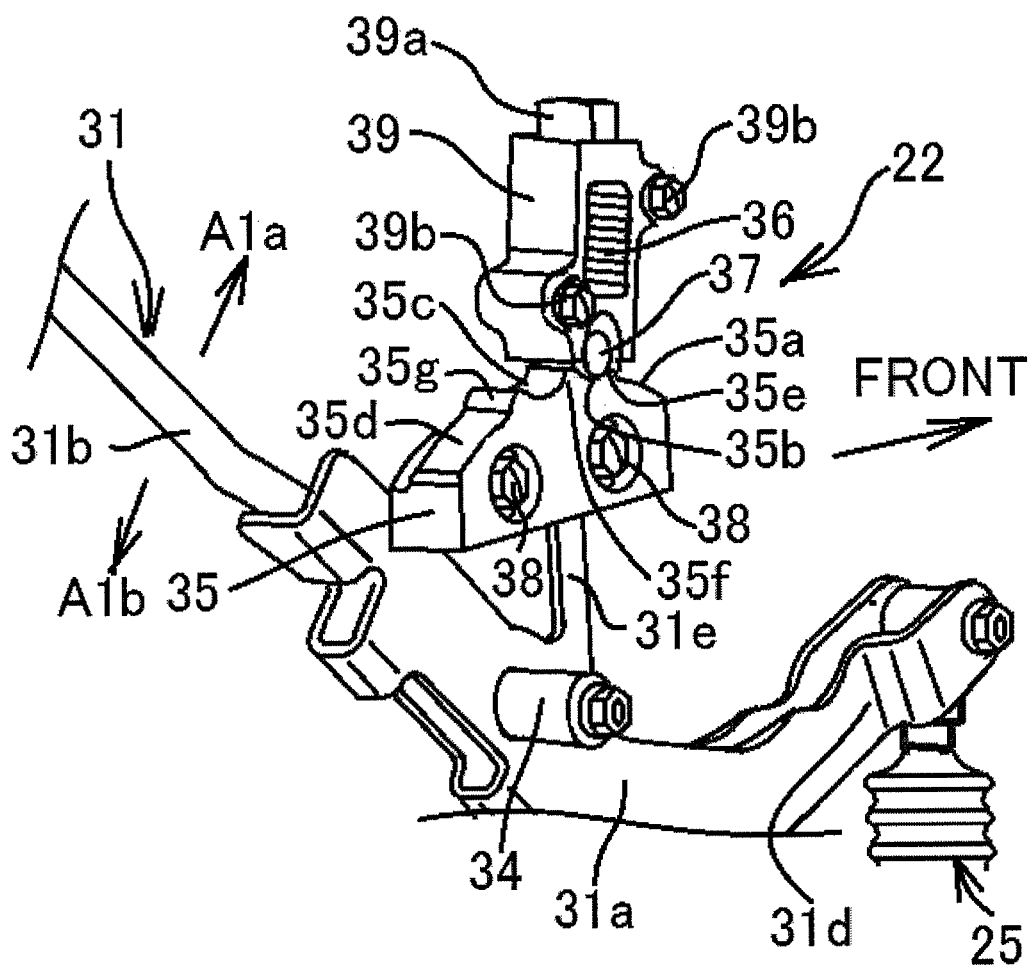
FIG. 6 is a perspective view showing a detent mechanism of the shift lever in FIG. 5.

In FIG. 6, the recess-formed member 35 is made of an elongated member in the forward and rearward direction, and is fixed to a mounting portion 31e formed on an upper end portion of the base 31a by means of a pair of bolts 38. The upper end surface of the recess-formed member 35 is formed in an arc-shape along a circle centered at a center line of the shift lever shaft 34. The upper end surface of the recess-formed member 35 is divided into four detent recesses 35a, 35b, 35c, and 35d by three protrusions 35e, 35f, and 35g. The detent recesses 35a, 35b, 35c, and 35d are formed in a partial-arc shape, and are, in the order from front to rear, a reverse detent recess 35a, a neutral detent recess 35b, a high detent recess 35c for forward traveling high-speed, and a low detent recess 35d for forward traveling low-speed. Although the four detent recesses 35a, 35b, 35c, and 35d are formed in the partial-arc shape, a front end of the reverse detent recess 35a on the front end side is opened forward, and a rear end of the low detent recess 35d on the rearmost side is opened rearward.

Figure 4:
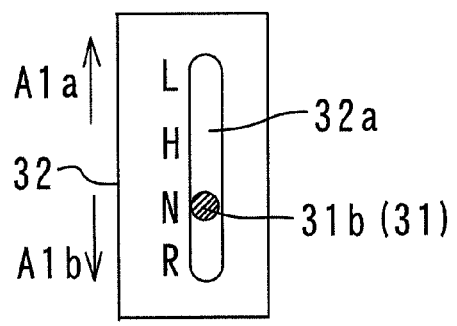
FIG. 4 is a plan view of a shift panel of the shift lever device shown in FIG. 3.

In FIG. 4, the shift groove 32a is formed in a straight line shape extending from an upper forward end portion of the shift panel 32 to a lower rearward end portion thereof. Then, the shift lever 31 moves in a straight line in an inside of the shift groove 32a so that four shift positions are switched. The four shift positions are, in the order from the upper forward end to the lower rearward end, a forward traveling low-speed position (L), a forward traveling high-speed position (H), a neutral position (N), and a reverse position (R).

Figure 5:
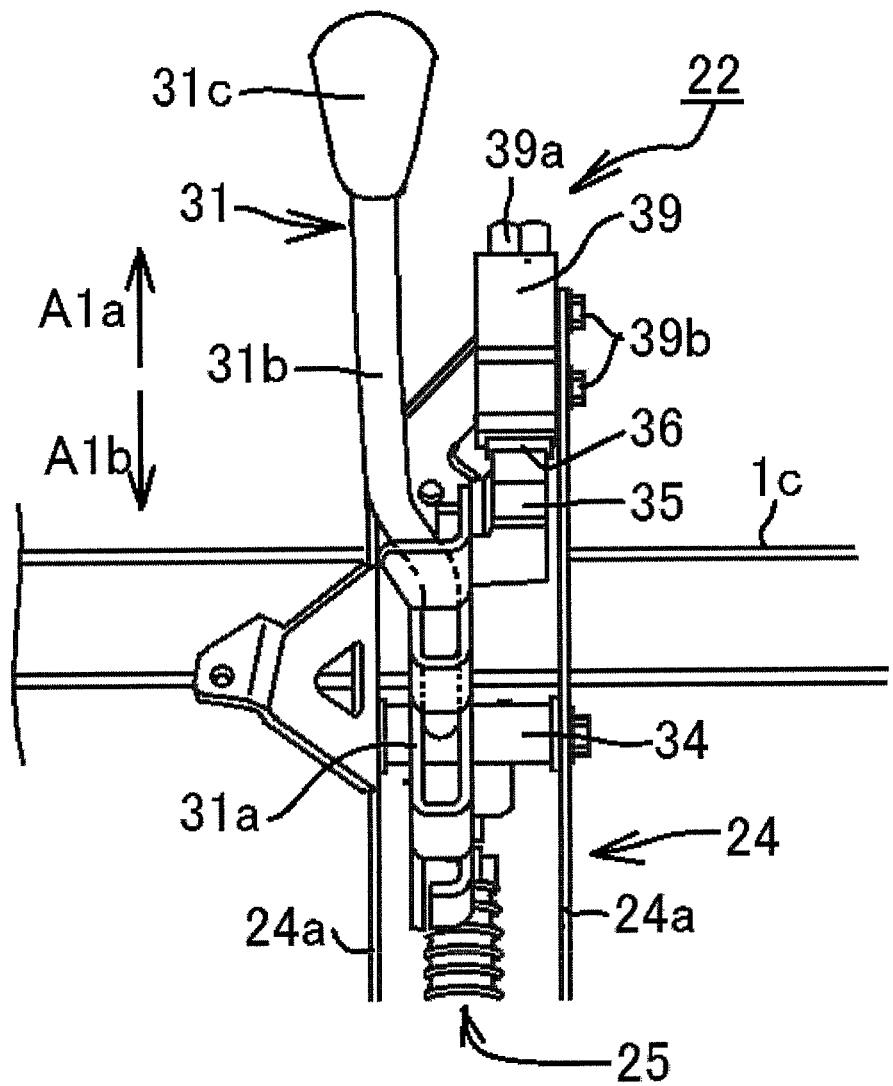
FIG. 5 is a rear elevation of the shift lever device shown in FIG. 3.

In FIG. 5, the lever holder 24 integrally has right and left side walls 24a,24a, and the base 31a of the shift lever 31 is located between both the side walls 24a,24a.

Figure 7:
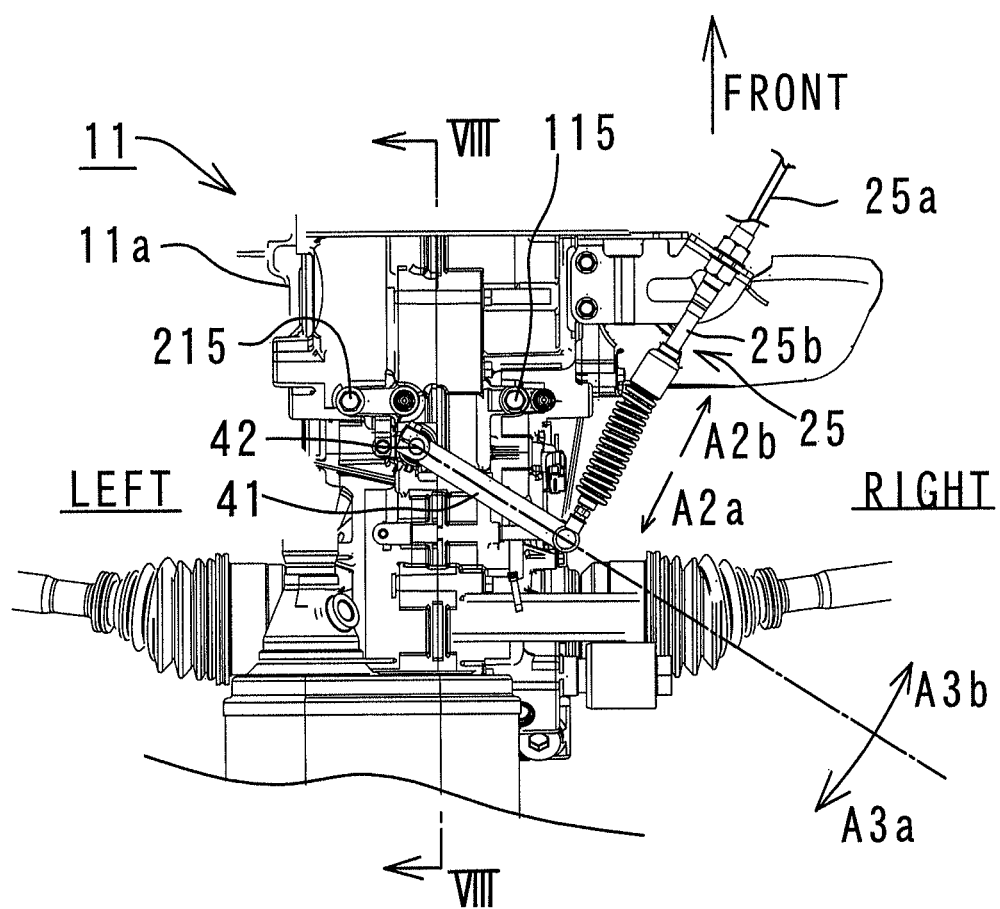
FIG. 7 is a partially plan view of the transmission in FIG. 1.

In FIG. 7, a rear end portion of the inner cable 25a of the push pull cable 25 is connected to an outer lever 41 arranged above a transmission case 11a. The outer lever 41 is fixed to an upper end portion of the lever shaft 42 extending approximately vertically.

Figure 8:
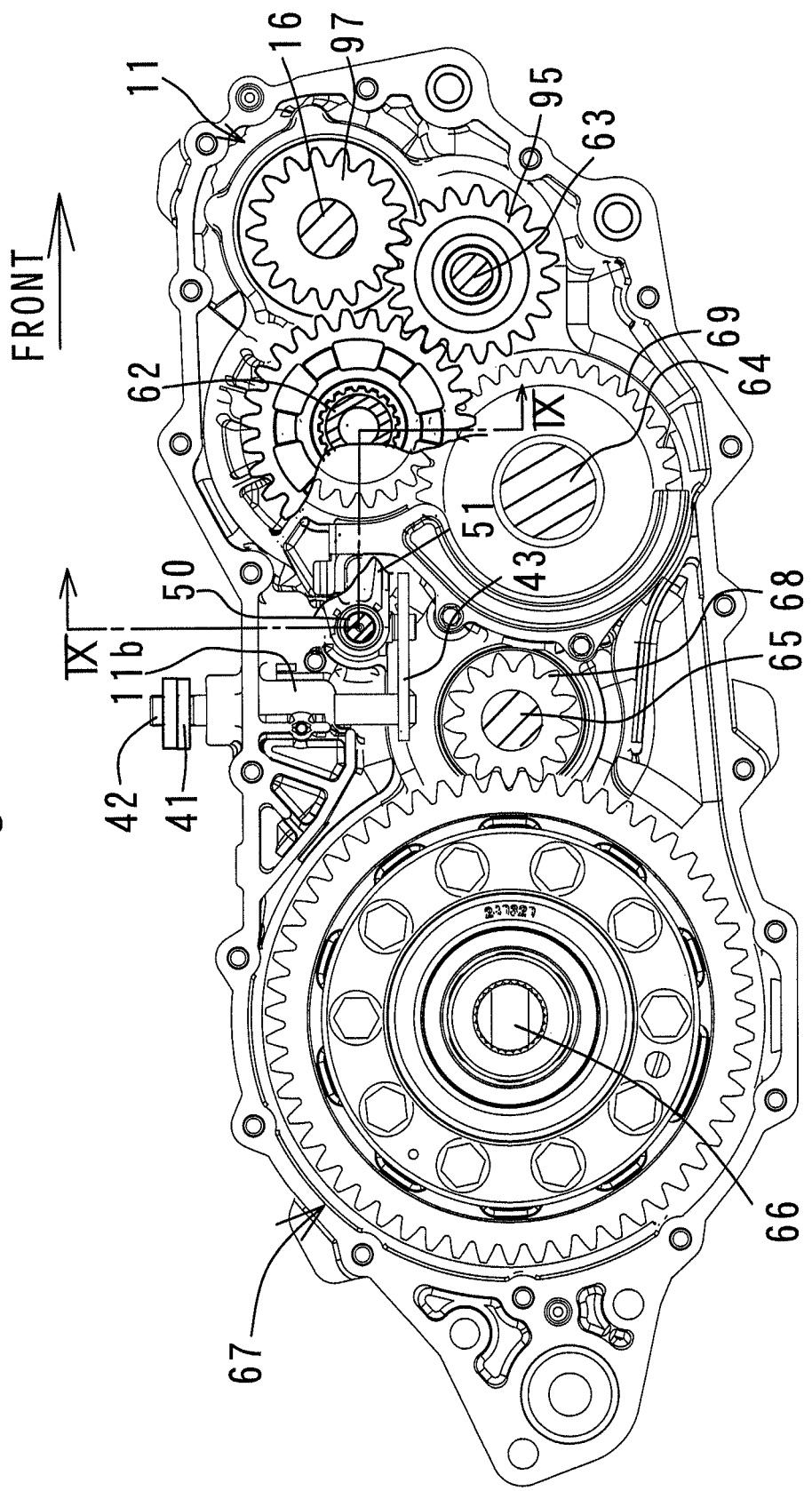
FIG. 8 is a sectional enlarged view taken along in FIG. 7.

In FIG. 8, the lever shaft 42 is located in an approximately center portion in the forward and rearward direction of the transmission case 11a, then passes through an upper wall boss portion 11b of the transmission case 11a in the upper and down direction, and then is free-rotatably supported by the upper wall boss portion 11b. An inner lever 43 arranged in the transmission case 11a is fixed to a lower end portion of the lever shaft 42, and then extends forward in an approximately horizontal direction from the lever shaft 42, and then reaches a space under the shift shaft 50. The shift shaft 50 is arranged in front of the lever shaft 42 and extends in the right and left direction.

The gear transmission 11 is housed in a space on a front side of the shift shaft 50, and includes the input shaft 16 of the gear transmission 11, a counter shaft 62, a reverse idler shaft 63, and an output shaft 64 for the front wheels are arranged. An intermediate output shaft 65 for the rear wheels and a final gear mechanism 67 for the rear wheels are housed in a space on a rear side of the shift shaft 50.

Figure 10:
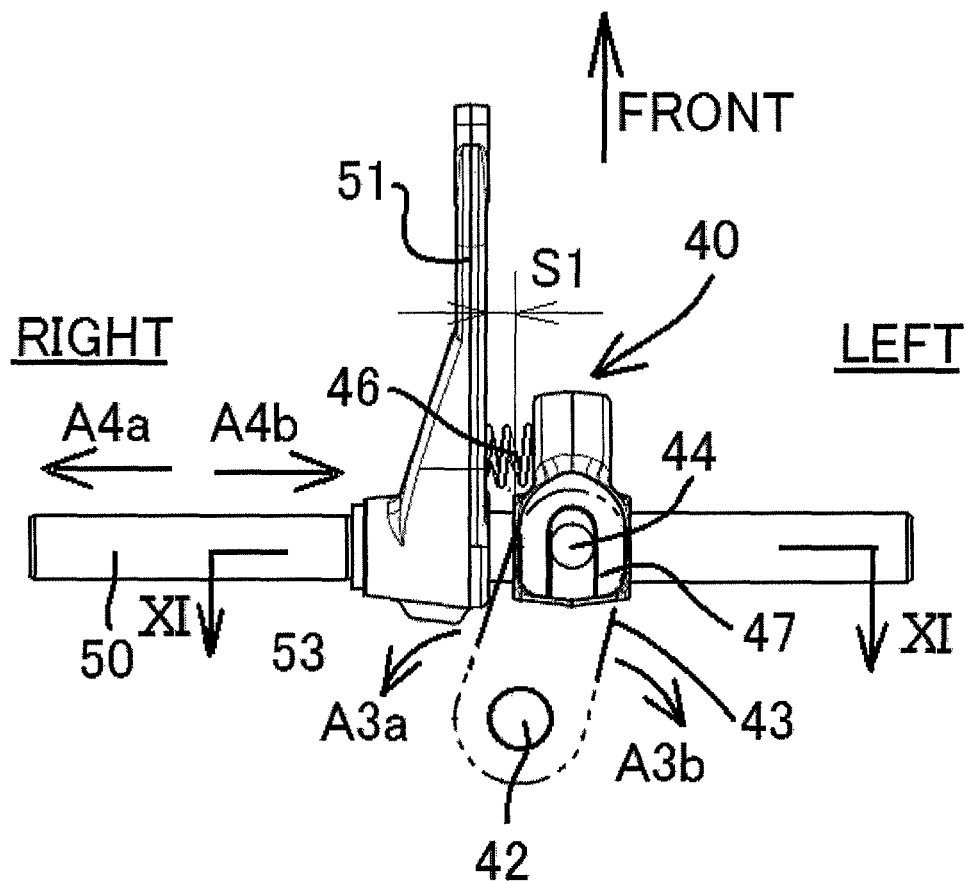
FIG. 10 is a bottom view of the shift shaft shown in FIG. 8.

FIG. 10 shows a bottom view of the shift shaft 50, the shift fork 51 is fit on an outer peripheral surface of the shift shaft 50 so as to be movable within a range of a predetermined stroke S1 in an axial direction. The shift fork 51 is connected to the inner lever 43 of the lever shaft 42 through a waiting mechanism 40 so as to transmit the shift operation force.

The waiting mechanism 40 includes a spring holder 45 arranged on a left side (in an arrow A4b direction side) of the shift fork 51 with a predetermined stroke S1 in between, and a coil spring 46 provided between the spring holder 45 and the shift fork 51 so as to be compressible and expandable in the axial direction. The coil spring 46 is arranged on a forward side of the shift shaft 50. An engagement groove 47 extending in the forward and rearward direction is formed in a lower surface of the spring holder 45. Then, a rearward end of the engagement groove 47 is opened. A front end portion of the inner lever 43 fixed to the lower end portion of the lever shaft 42 is provided with an engaging pin 44. The engaging pin 44 engages with the engagement groove 47 so as to be movable forward and rearward.

Figure 11:
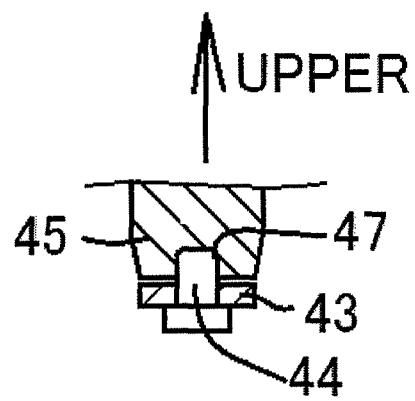
FIG. 11 is a sectional view taken along line XI-XI in FIG. 10.
Figure 12:
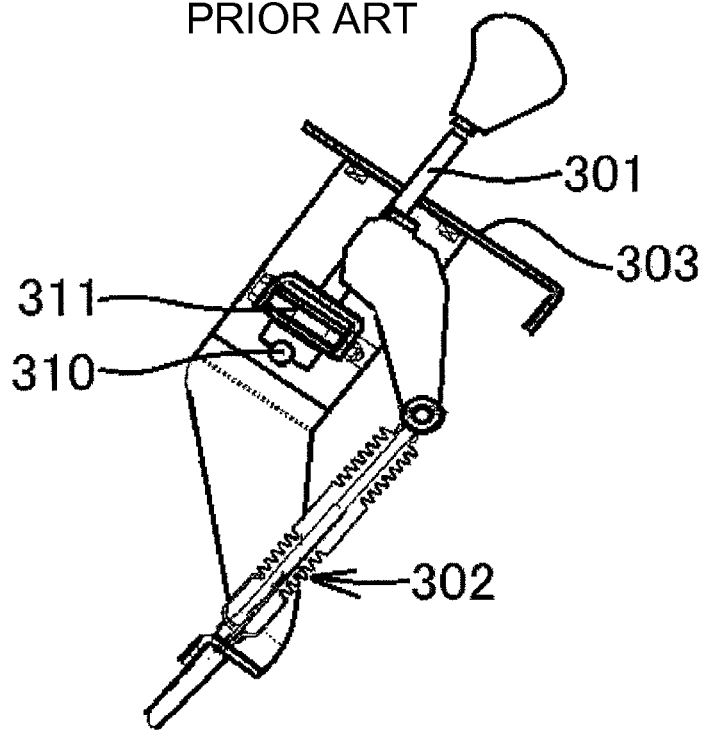
FIG. 12 is a sectional view of a conventional example.
Figure 13:
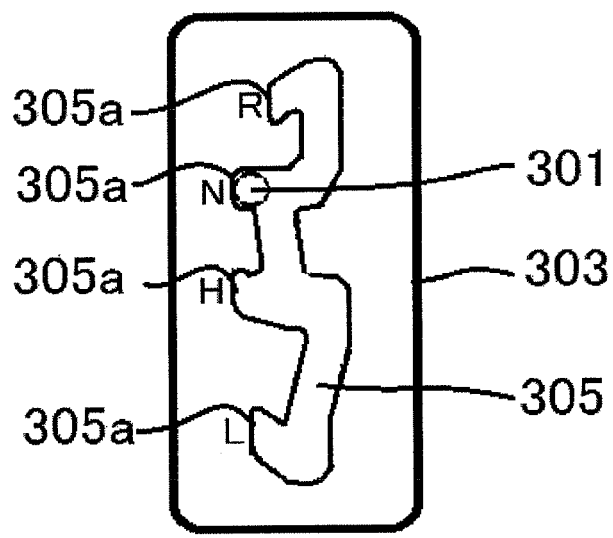
FIG. 13 is a plan view of a shift panel shown in FIG. 12.

FIG. 11 is a sectional view taken along line XI-XI in FIG. 10, where the engaging pin 44 of the inner lever 43 protrudes upward and then engages with the engagement groove 47 of the spring holder 45 from below.

Figure 9:
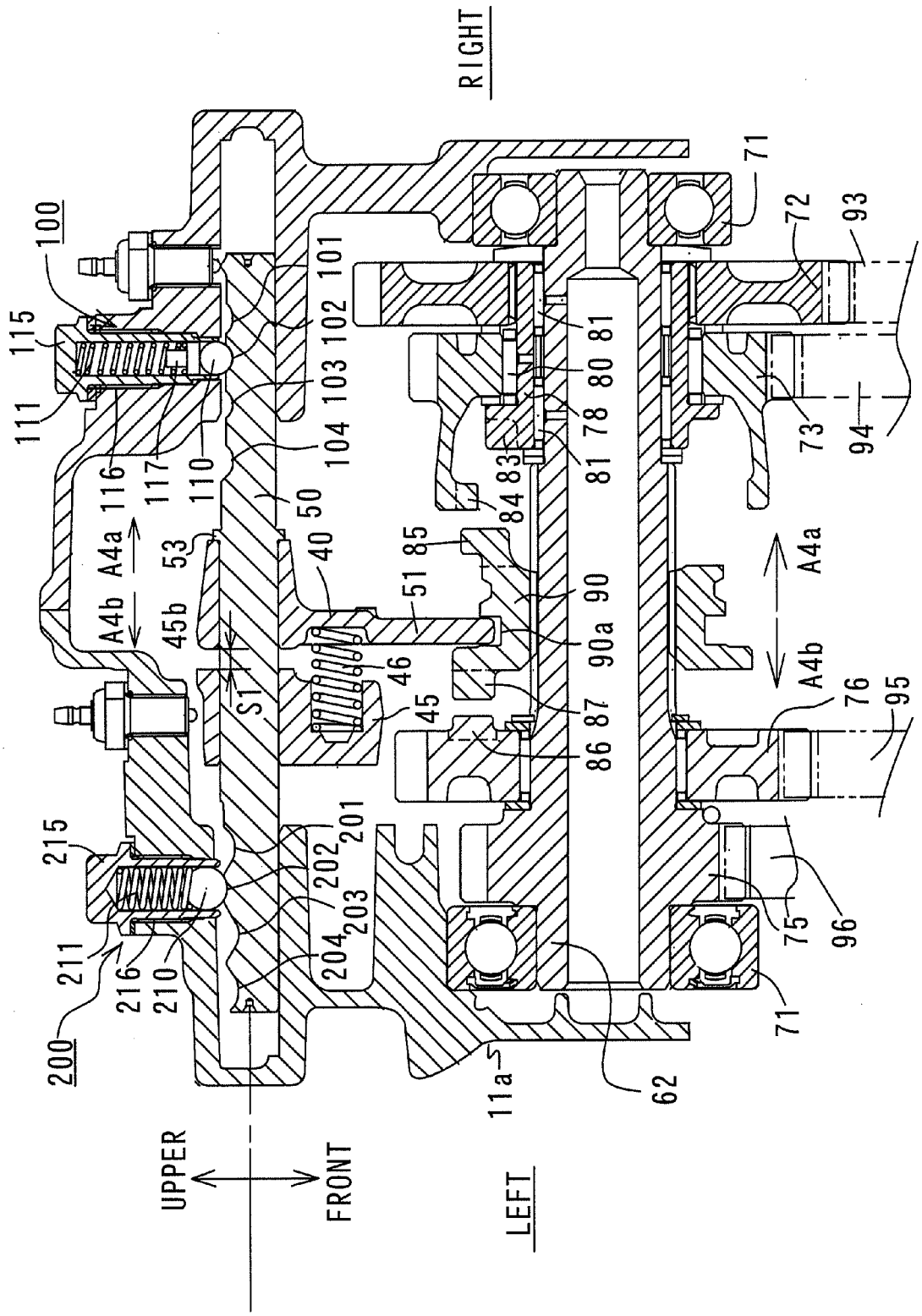
FIG. 9 is a sectional view taken along line IX-IX in FIG. 8.

In FIG. 9, the shift shaft 50 is supported by right and left, side walls of the transmission case 11a so as to be slidable in the axial direction. A shift sleeve 90 is spline-fit onto a center portion in the axial direction of the counter shaft 62 so as to be movable in the axial directional. An outer periphery circular groove 90a is formed with the shift sleeve 90, and a two-pronged portion of the shift fork 51 is engaged with the outer peripheral circular groove 90a.

In a right end portion of the counter shaft 62, a counter low gear 72 for forward traveling low-speed and a counter high gear 73 for forward traveling high-speed are arranged in the order from right to left. Then, in the left end portion of the counter shaft 62, an output gear 75 and a counter reverse gear 76 are arranged in the order from left to right. The output gear 75 is formed integrally with the counter shaft 62. The counter reverse gear 76 is fit onto the counter shaft 62 so as to be free-rotatable around the counter shaft 62 and not to be movable in the axial direction.

The counter low gear 72 is spline-fit onto an outer peripheral surface of a boss member 78 so as to rotate integrally with the boss member 78. The boss portion 78 is formed separately from the counter low gear 72. The counter high gear 73 is fit onto the outer peripheral surface of the boss member 78 with a needle bearing 80 in between so as to be free-rotatable relative to the boss portion 78. The boss member 78 is fit onto the outer peripheral surface of the counter shaft 62 with a pair of needle bearings 81 in between so as to be free-rotatable relative to the counter shaft 62. A left end portion of the boss member 78 is provided with low-speed dog claws 83 and the counter high gear 73 is provided with high-speed dog claws 84. The high-speed dog claws 84 is extend leftward beyond the low-speed dog claws 83. The counter reverse gear 76 is provided with reverse dog claws 86.

The counter low gear 72 and the counter high gear 73 engage respectively with an input low gear 93 and an input high gear 94. Further, the counter reverse gear 76 engages with an idle reverse gear 95 and the output gear 75 engages with a second output gear 96.

The input low gear 93 and the input high gear 94 are arranged on the input shaft 16 shown in FIG. 8. The idle reverse gear 95 is fit onto the reverse idler shaft 63 and engages with the input reverse gear 97 of the input shaft 16.

FIG. 9 shows a situation that the shift sleeve 90 is at a neutral position. When the shift sleeve 90 moves rightward (in an arrow A4a direction) from the neutral position, first, the forward traveling dog claws 85 of the shift sleeve 90 engage with the high-speed dog claws 84 of the counter high gear 73 so that the gear transmission 11 goes into the forward traveling high-speed state. Further, when the shift sleeve 90 moves in the arrow A4a direction, the forward traveling dog claws 85 of the shift sleeve 90 pass a neutral state and then engage with the low-speed dog claws 83 of the boss member 78 so that the gear transmission 11 goes into the forward traveling low-speed state. On the contrary, when the shift sleeve 90 moves leftward (in an arrow A4b direction) from the neutral position, the reverse dog claws 87 of the shift sleeve 90 engage with the reverse dog claws 86 of the counter reverse gear 76 so that the gear transmission 11 goes into the rearward traveling state.

The shift device is further provided with a second detent mechanism 100 formed in a right side portion in the axial direction of the shift shaft 50 and a third detent mechanism 200 formed in a left side portion of the shift shaft 50.

The second detent mechanism 100 includes four detent recesses 101, 102, 103, and 104 formed in an upper end surface of the shift shaft 50, a second detent ball 110 arranged on the upper surface of the shift shaft 50, and a second detent spring 111 for pressing the second detent ball 110 against the upper surface of the shift shaft 50. The four detent recesses 101, 102, 103, and 104 are, in the order from right to left, a reverse detent recess 101, a neutral detent recess 102, a high detent recess 103 for forward traveling high-speed, and a low detent recess 104 for forward traveling low-speed.

A basic configuration of the third detent mechanism 200 is similar to that of the second detent mechanism 100, and includes four detent recesses 201, 202, 203, and 204, a third detent ball 210, and a third detent spring 211.

The four detent recesses 201, 202, 203, and 204 are, in the order from right to left, a reverse detent recess 201, a neutral detent recess 202, a high detent recess 203 for forward traveling high-speed, and a low detent recess 204 for forward traveling low-speed.

The shift operation is described below.

[Shift from the Neutral State to the Forward Traveling High-Speed State]

(1) In FIG. 1, the driver sitting on the driver's region 6a grips the knob 31c with his/her right hand, and operates the shift lever 31. Namely, as shown in FIG. 4, the driver turns the shift lever 31 from the neutral position (N) to the forward traveling high-speed position (H).

(2) In FIG. 3, when the shift lever 31 is turned in an arrow A1a direction from the neutral position (N) to the forward traveling high-speed position (H), the inner cable 25a of the push pull cable 25 is pushed down in an arrow A2a direction (downward) in the inside of the outer cable 25b. On this operation, the recess-formed member 35 integrally turns in the arrow A1a direction with the shift lever 31 around a center line of the shift lever shaft 34. Thereby, the protrusion 35f which is located at a second position from front pushes up the first detent pin 37 and passes over the first detent pin 37, and then the detent recess 35c for forward traveling high-speed engages with the first detent pin 37. As a result, the shift lever 31 is positioned at the forward traveling high-speed position (H) and hold.

(3) In FIG. 7, in association with the movement of the inner cable 25a in the arrow A2a direction, the outer lever 41 and the lever shaft 42 are turned or rotated about the center line of the lever shaft 42 in an arrow A3a direction.

(4) In FIG. 10, the inner lever 43 is turned integrally with the lever shaft 42 in the arrow A3a direction. In association with this, the shift shaft 50 and the spring holder 45 move integrally in the arrow A4a direction (rightward) through the engaging pin 44 and the edge of the engagement groove 47.

(5) In FIG. 9, when the shift shaft 50 and the spring holder 45 move in the arrow A4a direction (rightward), the shift fork 51 also moves in the arrow A4a direction with the coil spring 46 in between.

(6) When the shift shaft 50, the spring holder 45, the shift fork 51, and the shift sleeve 90 move in the arrow A4a direction from the neutral position to the forward traveling high-speed position, almost at the same time, the second detent ball 110 and the thirds detent ball 210 engage respectively with the high detent recesses 103 and 203.

[Shift from the Forward Traveling High-Speed State to the Forward Traveling Low-Speed State]

(1) In FIG. 4, the shift lever 31 is turned upward further from the forward traveling high-speed position (H) to the forward traveling low-speed position (L).

(2) In FIG. 3, when the shift lever 31 is turned in an arrow A1a direction from the forward traveling high-speed position (H) to the forward traveling low-speed position (L), the inner cable 25a of the push pull cable 25 is pushed down in an arrow A2a direction (downward) in the inside of the outer cable 25b. On this operation, the protrusion 35g which is located at a third position from front pushes up the first detent pin 37 and passes over the first detent pin 37, and then the detent recess 35d for forward traveling low-speed engages with the first detent pin 37. As a result, the shift lever 31 is positioned at the forward traveling low-speed position (L) and hold.

An action for transmitting the shift operation force after the push pull cable 25 is similar to an action at the time of shift from the above-mentioned neutral position to the forward traveling high-speed position.

[Shift from the Neutral State to the Rearward Traveling State]

(1) In FIG. 4, the driver turns downward the shift lever 31 from the neutral position (N) to the reverse position (R).

(2) In FIG. 3, when the shift lever 31 is turned in the arrow A1b direction from the neutral position (N) to the reverse position (R), the inner cable 25a of the push-pull cable 25 is pushed up in the arrow A2b direction (upward) in the inside of the outer cable 25b. On this operation, the recess-formed member 35 integrally turns in the arrow A1b direction with the shift lever 31 around the center line of the shift lever shaft 34. Thereby, the protrusion 35e which is located at first position from front pushes up the first detent pin 37 and passes over the first detent pin 37, and then the reverse detent recess 35a engages with the first detent pin 37. As a result, the shift lever 31 is positioned at the reverse position (R) and hold.

(3) In FIG. 7, in association with the movement of the inner cable 25a in the arrow A2b direction, the outer lever 41 and the lever shaft 42 are turned or rotated about the lever shaft axis in the arrow A3b direction.

(4) In FIG. 10, the inner lever 43 is turned integrally with the lever shaft 42 in the arrow A3b direction. In association with this, the shift shaft 50 and the spring holder 45 move integrally in the arrow A4b direction (leftward) thorough the engaging pin 44 and the edge of the engagement groove 47.

(5) In FIG. 9, when the shift shaft 50 and the spring holder 45 move in the arrow A4b direction (leftward), the shift fork 51 also moves in the arrow A4b direction with the stopper 53 in between.

(6) In association with the movement of the shift shaft 50 in the arrow A4b direction, the second detent ball 110 and the third detent ball 210 escape upward from the neutral detent recesses 102 and 202, respectively.

(7) When the shift shaft 50, the spring holder 45, the shift fork 51, and the shift sleeve 90 move in the arrow A4b direction from the neutral position to the reverse position, the reverse dog claws 87 of the shift sleeve 90 engage with the reverse dog claws 86 of the counter reverse gear 76. Almost at the same time, the second detent ball 110 and the third detent ball 210 engage respectively with the reverse detent recesses 101 and 201.

(8) In the reverse state of the gear transmission 11, the second and the third detent balls 110 and 210 engage respectively with the reverse detent recesses 101 and 201 so as to be positioned and held.

Operations to return from the forward traveling high-speed position, the forward traveling low-speed position, and the reverse position to the neutral position are forward traveling basic configuration of the third detent mechanism 200 are performed in the converse order to mentioned the operations.

Effects of the Embodiment (1) Since the operation force transmission mechanism is constituted by the push pull cable 25, compared with a connecting rod type, a layout flexibility for the push pull cable 25 between the shift lever device 22 and the transmission 11 increases, and an arrangement flexibility for the transmission 11 and the shift lever device 22 increase. Therefore, a design of the vehicle becomes facilitated. In addition, since the first detent mechanism 33 is provided in the shift lever device 22 which is positioned near the driver's hand, it becomes easy to adjust the shift lever device 22.

(2) Since the shift lever device 22 is arranged on a dashboard 14 located in front of the driver's seat 6a, it becomes possible to make efficient use of the space in front of the driver, and the driver can check the shift position of the shift lever 31 even when the driver looks forward.

(3) Since the operation force transmission mechanism is constituted by the push pull cable 25, it becomes possible to separately place the transmission 11 from the shift lever device 22 while exerting above the above effects.

(4) Since the shift panel 32 has the shift groove 32a through which the shift lever 31 passes, and the shift groove 32a is formed in an approximately straight line shape, the shift lever 31 can turn around only the axis of the pivot shaft 34. Therefore the shift lever device 22 becomes compact and simple.

(5) The shift lever device 22 is provided with the first detent mechanism 33. The recess-formed member 35 of the first detent mechanism 33 is arranged on the shift lever 22 which is rotatable around the center of the shift lever shaft 34, while the first detent spring 36 and the first detent ball 37 are arranged the lever holder 24 fixed to the dashboard frame 1c. Therefore, the shift lever 31 becomes compact while securing the stroke of the shift lever, i.e. the stroke of the cable connecting point of the inner cable 25a. In particular, in the case that shift lever device 22 is located within in the dashboard 14, the shift lever device 22 can be housed within the dashboard 14 without expanding the inner space of the dashboard 14.

(6) Since the shift groove 32a is formed in the approximately straight line shape, the operation of the shift lever 31 becomes linear, as a result, the operation of the shift lever 31 becomes simple.

(7) The recess-formed member 35 having the detent recesses 35a, 35b, 35c, 35d is provided on the outer peripheral end of the recess-formed member 35 in the radial direction of the shift lever shaft 34, and the first detent pin 37 is biased toward inside from outside of the shift lever shaft 34 in the radial direction. Therefore, although the suppress force of the first detent pin 37 due to the first detent spring 36 applies the shift lever 31, the suppress force does not act the shift lever 31 to bend the shift lever 31 as a bending load. As a result, on operating the shift lever 31, the shift lever 31 is not rickety in the axial direction.

(8) Since the first detent mechanism 33 has the detent pin 37 composed of a cylindrical roller pin parallel to the shift lever shaft 34, it is possible to eliminate the rickety of the shift lever 31 is not in the axial direction.

Other Embodiments (1) In the present invention, the detent mechanism (the first detent mechanism 33) may be provided with a detent ball instead to the cylindrical detent pin 37. Moreover, the detent mechanism (the first detent mechanism 33) may be provided with a detent leaf spring, a plurality of disc springs, or an elastic rubber instead of the first detent coil spring, as the elastic member.

(2) The present invention is not limited to the speed change apparatus of the utility vehicle, and the invention can be applied also to the speed change apparatus of a different-type four-wheeled vehicle or a motorcycle.

(3) The present invention is not limited to the configuration of the embodiment and includes various kinds of modifications as long as not departing from the contents described in the claims.

What is claimed is:

1. A speed change apparatus of a vehicle comprising:
a gear transmission;
a shift lever device arranged in a zone where an operation thereof is achievable from a driver's seat; and
an operation force transmission mechanism for transmitting an operation force of the shift lever device to the gear transmission, wherein
the shift lever device is provided with a detent mechanism for positioning and holding a shift lever at each of a plurality of shift positions,
the detent mechanism includes a recess-formed member having a plurality of recesses, and a detent member biased toward the recess-formed member by an elastic member,
each of the recesses corresponds to a respective one of the shift positions,
the recess-formed member is arranged on the shift lever which is turnable around a center of a shift lever shaft, and
the detent member and the elastic member are arranged on a lever holder for holding the shift lever.

2. The speed change apparatus of the vehicle according to claim 1, wherein
the shift lever device includes a shift panel; and
the shift panel is provided with a shift groove of approximately straight line shape where the shift lever passes.

3. The speed change apparatus of the vehicle according to claim 1, wherein
the plurality of the recesses is formed on an outer peripheral end of the recess-formed member in a radial direction of the shift lever shaft, and
the detent member is biased toward inside from outside of the shift lever shaft in the radial direction.

4. The speed change apparatus of the vehicle according to claim 1, wherein
the detent member is composed of a cylindrical roller pin parallel to the shift lever shaft.

5. The speed change apparatus of the vehicle according to claim 1, wherein
the operation force transmission mechanism is constituted by a push pull cable.

\* \* \* \* \*